(12) United States Patent
Thies

(10) Patent No.: US 10,309,309 B2
(45) Date of Patent: Jun. 4, 2019

(54) AIR GUIDING DEVICE AND AIRCRAFT ENGINE WITH AIR GUIDING DEVICE

(71) Applicant: Rolls-Royce Deutschland Ltd & Co KG, Blankenfelde-Mahlow (DE)

(72) Inventor: Robert Thies, Schwielowsee (DE)

(73) Assignee: ROLLS-ROYCE DEUTSCHLAND LTD & CO KG (DE)

( * ) Notice: Subject to any disclaimer, the term of this patent is extended or adjusted under 35 U.S.C. 154(b) by 293 days.

(21) Appl. No.: 14/845,704

(22) Filed: Sep. 4, 2015

(65) Prior Publication Data

US 2016/0069265 A1 Mar. 10, 2016

(30) Foreign Application Priority Data

Sep. 5, 2014 (DE) .................. 10 2014 217 835

(51) Int. Cl.
| | | |
|---|---|---|
| *F02C 7/18* | (2006.01) | |
| *B64D 13/02* | (2006.01) | |
| *F01D 9/06* | (2006.01) | |
| *F01D 25/14* | (2006.01) | |
| *F02K 3/06* | (2006.01) | |
| *F02C 6/08* | (2006.01) | |
| *F02C 7/20* | (2006.01) | |

(52) U.S. Cl.
CPC .............. *F02C 7/18* (2013.01); *B64D 13/02* (2013.01); *F01D 9/065* (2013.01); *F01D 25/14* (2013.01); *F02C 6/08* (2013.01); *F02C 7/20* (2013.01); *F02K 3/06* (2013.01); *Y02T 50/675* (2013.01)

(58) Field of Classification Search
CPC . F01D 9/06; F01D 9/065; F01D 25/14; B64D 13/02; B64D 2033/024; B64D 2241/00; F02K 1/80; F02K 9/343; F02K 3/077; F02C 7/20; F02C 7/18
See application file for complete search history.

(56) References Cited

U.S. PATENT DOCUMENTS 5,203,163 A * 4/1993 Parsons ............... F02C 6/08
 60/226.1
5,729,969 A * 3/1998 Porte .................. F02C 6/08
 60/226.1
(Continued)

FOREIGN PATENT DOCUMENTS

DE 10042933 A1 3/2002
EP 2857666 A1 4/2015
(Continued)

OTHER PUBLICATIONS

European Search Report dated Jan. 21, 2016 for related European application No. 15183756.4.
(Continued)

*Primary Examiner* — Steven M Sutherland
*Assistant Examiner* — Thuyhang N Nguyen
(74) *Attorney, Agent, or Firm* — Shuttleworth & Ingersoll, PLC; Timothy J. Klima

(57) ABSTRACT

An air guiding device in an aircraft engine, comprising at least one connection device of a core engine shroud with an external wall of a bypass duct of the aircraft engine is provided. At least one first air inlet opening for inflowing air is connected to a connection device or is arranged inside the connection device.

17 Claims, 7 Drawing Sheets

(56) References Cited

U.S. PATENT DOCUMENTS

| | | | |
|---|---|---|---|
| 7,200,999 B2* | 4/2007 | Bagnall | B64C 21/06 |
| | | | 60/226.1 |
| 2003/0233834 A1 | 12/2003 | Boeck | |
| 2010/0150700 A1 | 6/2010 | Strecker et al. | |
| 2014/0037437 A1 | 2/2014 | Wood et al. | |
| 2015/0361891 A1* | 12/2015 | Schwarz | F02C 7/14 |
| | | | 60/772 |

FOREIGN PATENT DOCUMENTS

| | | |
|---|---|---|
| EP | 2860412 A1 | 4/2015 |
| GB | 695482 A | 8/1953 |

OTHER PUBLICATIONS

German Search Report dated May 11, 2015 for related German application No. 10 2014 217 835.5.

* cited by examiner

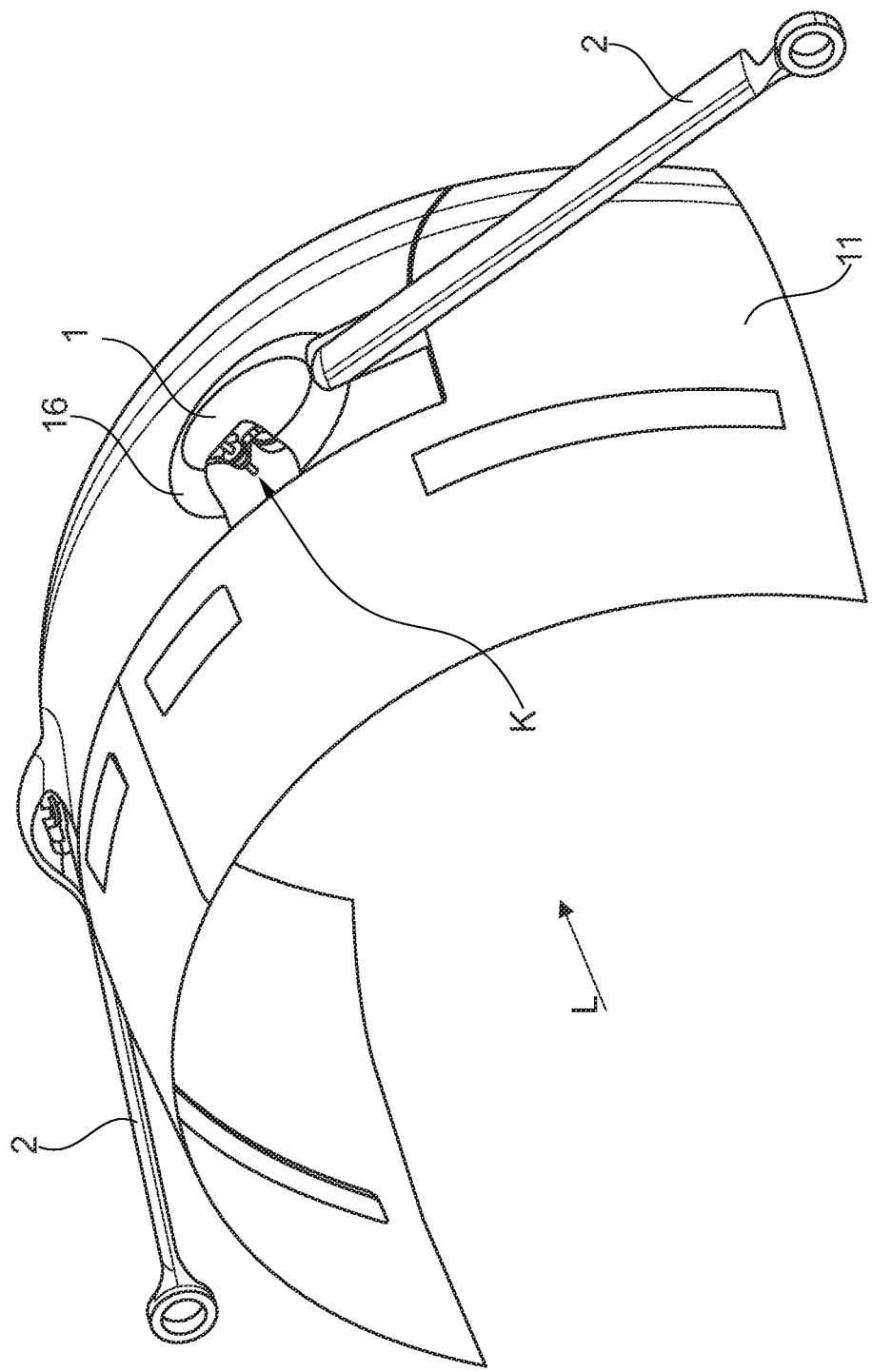

AIR GUIDING DEVICE AND AIRCRAFT ENGINE WITH AIR GUIDING DEVICE

CROSS-REFERENCE TO RELATED APPLICATION

This application claims priority to German Patent Application No. 10 2014 217 835.5 filed on Sep. 5, 2014, the entirety of which is incorporated by reference herein.

BACKGROUND

The invention relates to an air guiding device and an aircraft engine.

For reasons of thermal efficiency, ever higher temperatures are aimed at in aircraft engines. As a consequence, many areas, such as e.g. the walls of turbines or compressors, are exposed to increased thermal loads.

SUMMARY

Therefore, there is the objective to create devices which render the distribution of air in the interior of a core engine shroud as efficient as possible, in particular for the purpose of cooling those parts in the aircraft engine that are subject to thermal loads.

This objective is solved by an air guiding device with the features as described herein.

Here, in the area of a connection device between the core engine shroud and an external wall of a bypass duct of the aircraft engine, at least one first air inlet opening is provided that is connected to the connection device or arranged inside of the same. Thus, the connection device does not only serve for the mechanical connection of the core engine that is enclosed by the core engine shroud, but at the same time, with its at least one first air inlet opening, the connection device comprises a means for the thermal control of areas in the core engine, for example. Independently of the thermal control, the entering air can also be used for other purposes in the aircraft engine.

In one embodiment, at least one connection device is configured as a strut. These oblong, comparatively narrow structural elements offer little resistance to the flow inside the bypass duct. Here, the strut can be arranged radially or tangentially with respect to the core engine shroud.

In another embodiment, the at least one first air inlet opening can be arranged in a housing at the core engine shroud. In this way, the housing, which is already being used for the attachment of the connecting struts, can also be used for the thermal control in the aircraft engine. In particular the housing can be a protrusion of the core engine shroud or a strut of the connection device.

In one embodiment of the air guiding device, the at least one first air inlet opening for inflowing air serves for cooling at least one area of a wall of a turbine, a part of the at least one connection device, an electric device and/or a bearing housing.

In addition or as an alternative, the air inlet device can comprise a means for building up a counter-pressure by means of the inflowing air in the interior of the aircraft engine, in particular in the spacial area of bearings of the turbine and/or of the compressor. Thus, a counter-pressure is used e.g. in the bearing chambers of shafts in which oil is injected, so that the oil remains in the bearing housing. Here, the entering air serves primarily for the buildup of pressure inside the bearing housing. Also, an embodiment can comprise a means for building up a counter-pressure in the spacial area around the wall to be cooled, in particular the wall of the turbine.

In another embodiment, the at least one sealing barrier serves for separating the air that has entered through the at least one first air inlet opening from other areas of the core engine shroud. In particular the at least one sealing barrier comprises an elastic ribbon, an elastic membrane and/or a gaiter. The sealing barrier can also be configured as an circumferential ring in order to create a separation of the air that has entered through the at least one first air inlet opening from other areas of the core engine shroud.

Furthermore, at least one second air inlet opening can be arranged in the bypass duct upstream of the at least one first air inlet opening. In this way, other areas, such as e.g. a wall of the compressor, can be cooled. Here, it is not necessary that the at least one second air inlet opening is arranged at a connection device.

Further, in one embodiment the air conduction of the inflowing air through the at least one first and/or second air inlet opening can be used for suppressing an air flow from the internal area of the aircraft engine into the bypass duct.

If a guiding device for guiding an air flow in the core engine shroud and/or housing is provided, different air flows can be guided to a location in a well-directed manner, or air flows can be intermixed in a well-directed manner, e.g. to achieve an aerodynamic sealing effect.

The objective is also solved by an aircraft engine with an air guiding device as described herein.

Here, it is possible that the at least one other air inlet device is provided outside of a connection device, so that the air, in particular cooling air or counter-pressure air in the interior of the core engine shroud, can be fed from different sources.

BRIEF DESCRIPTION OF THE DRAWINGS

Embodiments are described by way of example in connection to the drawings.

FIG. 2C shows a perspective rendering of an embodiment with two first air inlet openings.

DETAILED DESCRIPTION

Figure 1:
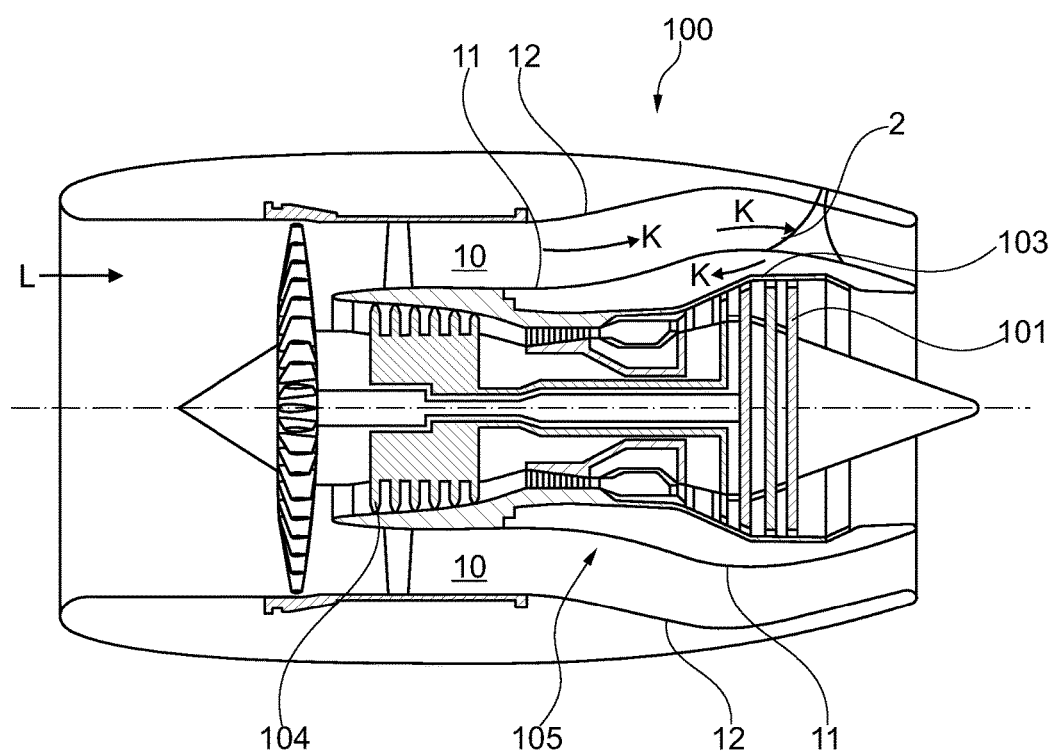
FIG. 1 shows a schematic rendering of an embodiment in a sectional view through a portion of an aircraft engine.

FIG. 1 schematically shows, in a sectional view, an aircraft engine 100 which comprises a multi-stage compressor 104 (fan, medium-pressure and high-pressure compressor) and a multi-stage turbine 101 (high-pressure, medium-pressure, low-pressure turbine) in the core engine 105.

Such a turbine and compressor configuration is typical of a three-shaft engine 100. Less stages are correspondingly used in a single-shaft engine or a two-shaft engine. The embodiments of the air guiding devices that are described in the following can also be used for those types of engines.

For the most part, the air L that is flowing into the aircraft engine 100 is guided through a bypass duct 10. Here, a core engine shroud 11 is connected through a first connection device 2 (shown here is only one of several connection devices 2 that are distributed around the circumference) to a jacket housing 13. The bypass duct 10 is confined radially externally by an external wall 12 (i.e. the interior surface of the jacket housing 13) and radially internally by an internal wall; i.e. the internal wall is the core engine shroud 11.

As will be described in the following, here the at least one first connection device 2 has a first air inlet opening 1 in order to convey air K from the bypass duct 10 into the internal space of the core engine shroud 11. Usually multiple connection devices 2 are provided, wherein the first air inlet opening 1 for air K is arranged in at least one of the connection devices 2.

In the following, an embodiment of an air guiding device is described with which areas of a wall 103 of the multi-stage turbine 101 are cooled (see FIG. 3). This air guiding device can principally also be used in different types of aircraft engines 100 and is not limited to the types shown in the figures.

Here, the first air inlet opening 1 is arranged in the area of the first connection device 2, which is arranged in the area of the turbine 101. In addition, a second connection device 4 with a second air inlet opening 3 can also be arranged in the front area of the aircraft engine 100. The second air inlet opening 3 can also be arranged in a core engine shroud 11.

It is also possible that the first connection device 2 with the first air inlet opening 1 is arranged in the front area of the aircraft engine 100.

Figure 2A:
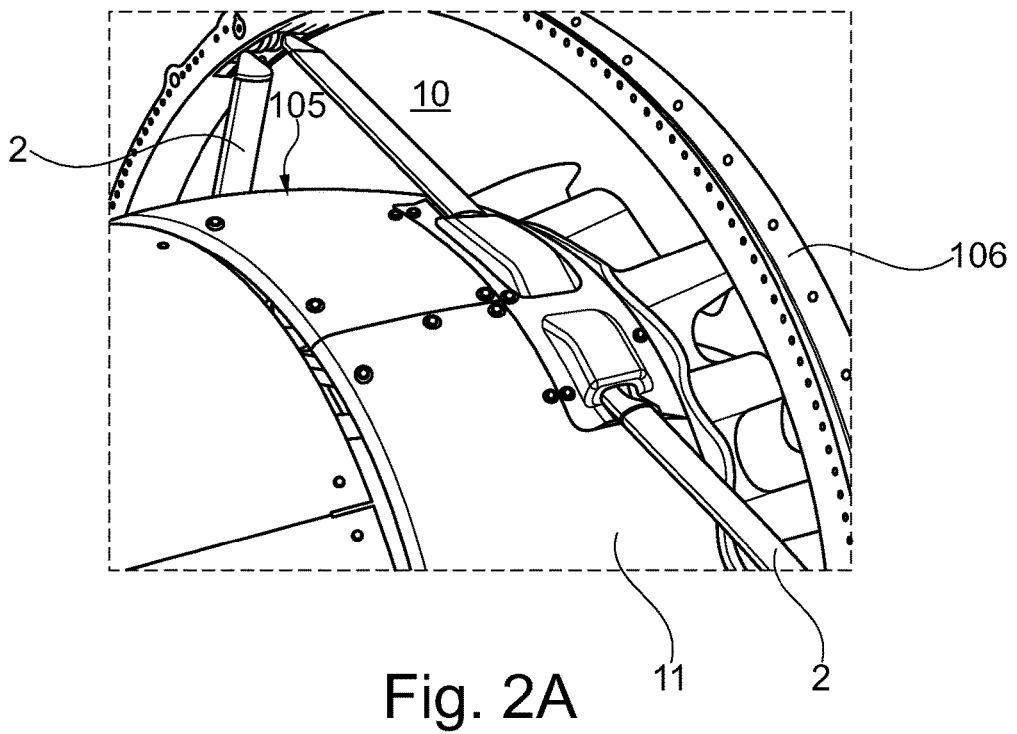
FIG. 2A shows a perspective view of a detail of a connection of a core engine shroud to a jacket housing of the aircraft engine with a connection device, as known in the state of the art.

In FIG. 2A, details of a connection of the core engine shroud 11 to a jacket housing 13 of the aircraft engine 100 by means of a connection device 2, as it is known in the state of the art, are shown in a perspective view. Here, the connection device 2 has two struts that are connected with a fastening ring 106. Here, the fastening ring 106 is arranged at the external wall 12, which is not shown here. On that side of the core engine 105 that is facing away, at least one other connection device 2 is arranged which is connected to the fastening ring 106 with the strut that can be seen here. The struts of the connection device 2 extend through the bypass duct 10.

The connection device 2 is connected to the core engine shroud 11, wherein the connection area of the core engine shroud 11 comprises bulges—i.e. a kind of housing 16—for the connection device 2 which is not shown here.

The air flow in the bypass duct 10, which is cool as compared to the flow in the core engine 105, flows around the connection device 2.

Figure 2B:
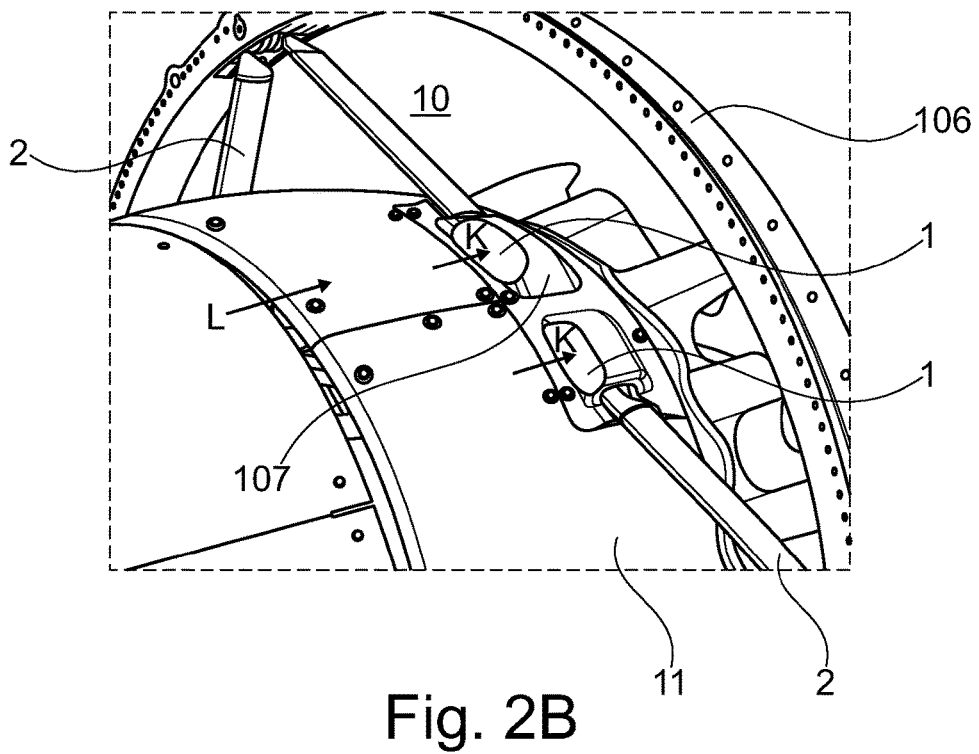
FIG. 2B shows an embodiment of an air guiding device with two first air inlet openings in the area of the connection device.

In FIG. 2B, an embodiment of the air guiding device is shown in which two first air inlet openings 1 for the air K are provided in the root area of the struts of the connection device 2 at the core engine shroud 11. The air flow L in the bypass duct 10 impinges on the two first air inlet openings 1 and is guided by the same into the inside of the core engine shroud 11 (see e.g. FIGS. 3 and 4). In this manner, a portion of the air flow L is abstracted from the bypass duct flow 10.

In this embodiment, the first air inlet openings 1 are integrated into a kind of housing 16 that is formed by the protrusion of the core engine shroud 11. In addition or alternatively, the first air inlet openings 1 can also be arranged in the struts of the connection device 2 (see FIG. 4). The air K is then conveyed through the inside of the struts into the core engine 105; the struts then form the housing 16 for the first air inlet openings 1.

Thus, a first air inlet opening 1 that is connected to the connection device 2 is arranged in the area of the connection device 2 between the core engine shroud 11 and the external wall 12 (not shown in FIG. 2B) of the bypass duct 10.

Principally, there are different options for connecting the core engine shroud 11 to the external wall 12, so that the use of the struts of the connection device 2 that is shown here shall not be regarded as limiting.

FIG. 2B shows struts that are arranged substantially tangentially to the core engine shroud 11. Alternatively or in addition, the struts can also be arranged radially on the core engine shroud 11 (see FIG. 4).

The entry of the air K into the core engine housing 11 can be seen in the perspective rendering of FIG. 2C. The housing 16 for the connection device 2 at the core engine housing 2 is a kind of bulge of the core engine housing, i.e. it can be formed in one piece with the same. The first air inlet opening 1 is arranged in this housing 16 for the connection device 2, so that the entering air K can enter the core engine via the housing 16.

Figure 3:
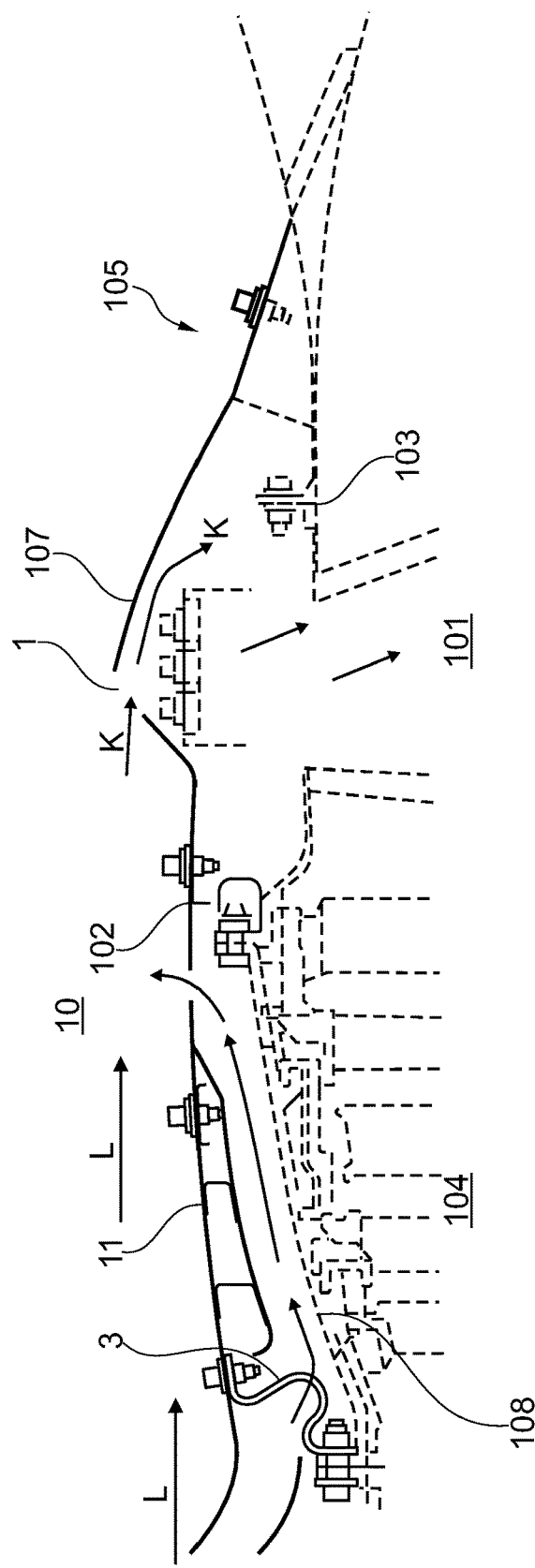
FIG. 3 shows a sectional view through the core engine shroud with an embodiment of an air guiding device.

In FIG. 3, a sectional view through the core engine shroud 11 is shown, wherein the core engine is surrounded by a wall 103. For reasons of simplicity, features of the turbine 101 and of the rear turbine housing 107 are not shown in any more detail here. In FIG. 3, the axial extension of the turbine 101 and of the rear turbine housing are indicated.

In FIG. 3, the air flow L in the bypass duct 10 runs from left to right. In the rear area, in the area of the rear turbine housing 107, in the housing 16 of a connection device 2 (not visible here due to the tangential arrangement according to FIG. 2B), a first air inlet opening 1 is shown, through which the air K reaches the inside of the core engine shroud 11, e.g. to serve for the purpose of increasing the pressure in a bearing housing (see FIG. 5).

Arranged upstream is the compressor 104 that has a compressor wall 108 which is also cooled with air K. For this purpose, the air flow K, which also comes from the bypass duct 10, is guided into the inside of the core engine shroud 11, wherein the air flow K is subsequently guided into the bypass air duct 10.

For cooling in the front area of the aircraft engine 100, the core engine shroud 11 has a second air inlet opening 3, which is shown in FIG. 1.

The impingement of these areas by air K can be effected through a second air inlet opening 3 that is configured in the usual manner, or via a second air inlet opening 3 which is arranged in a second connection device 4 (see FIG. 1).

Figure 4:
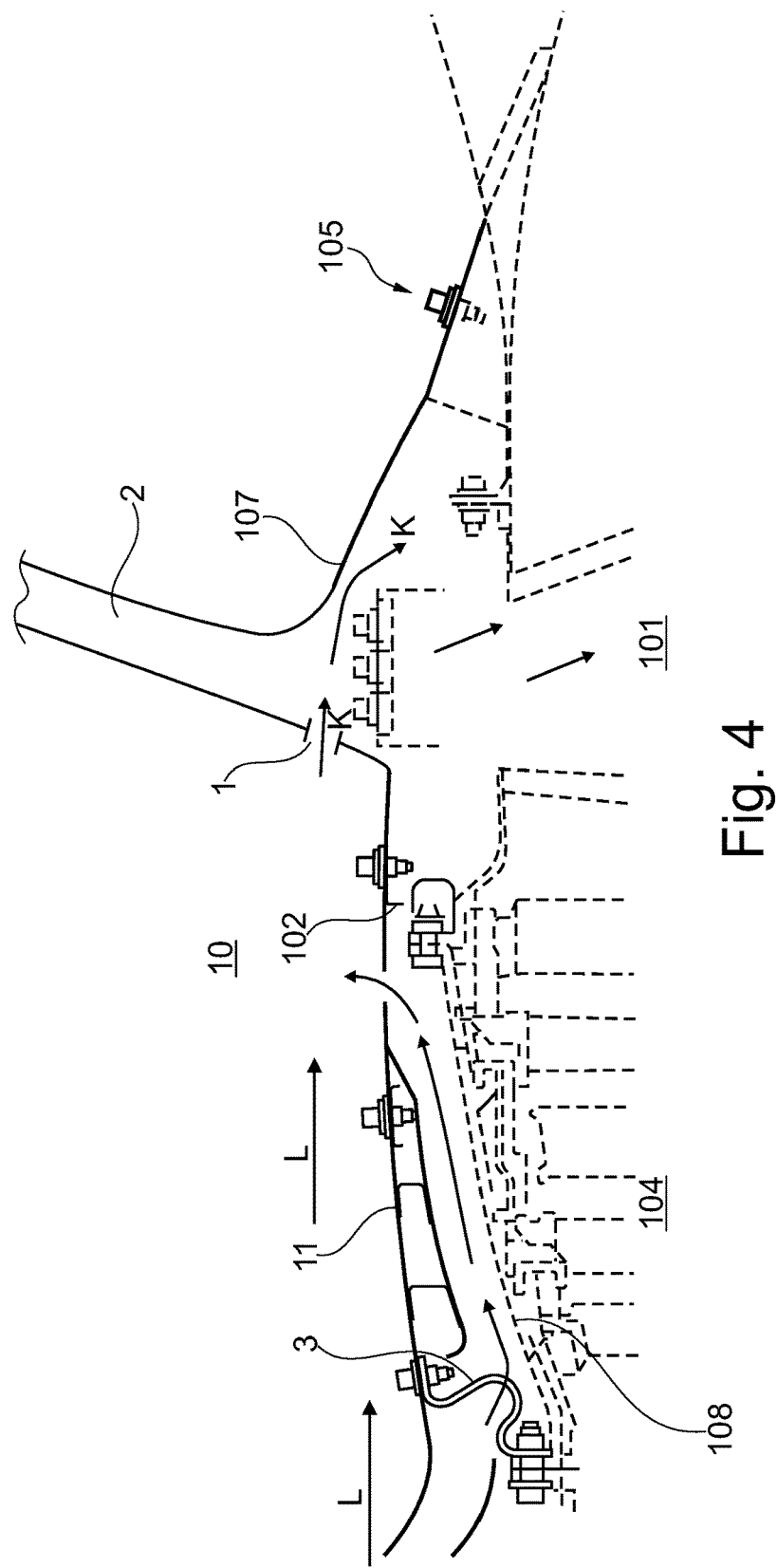
FIG. 4 shows a sectional view analogous to FIG. 3 with another embodiment of the air guiding device.

As a complement to the embodiment of FIG. 3, the description of which can be referred to, FIG. 4 shows another embodiment in which the strut 2 of the connection device is arranged radially with respect to the core engine shroud 11.

Furthermore, another application, which can also be used in combination with other embodiments, is shown here in a schematic manner.

In aircraft engines 100, shafts (not shown here) are mounted with bearings 111. The bearings 111 are e.g. surrounded by bearing housings 109. For lubrication of the bearing 111, injection of oil 110 is provided. The objective here is to keep the oil inside the bearing housing 109, particularly also because the bearing housing 109 has openings through which the oil can escape.

In the shown embodiment, the entering air K is not used primarily for cooling but rather for building up a counter-pressure for the oil in the bearing housing 109. This is indicated in FIG. 4 by the two arrows K, with the air K being guided from outside to the bearing housing 109 and the pressure being increased there. Also, in this way no hot air can escape from the turbine 101.

Figure 5:
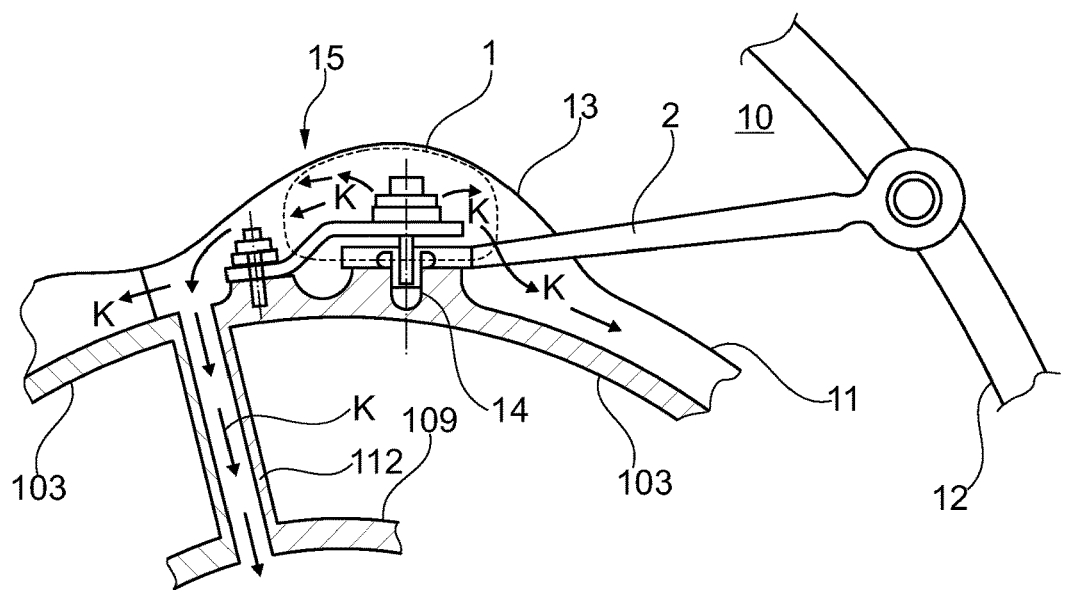
FIG. 5 shows a schematic sectional view through an embodiment having a means for guiding air into the core engine.

In FIG. 5, a sectional view, obliquely to the longitudinal axis of the aircraft engine 100 through the core engine shroud 11 and the bypass duct 10, is shown. The first connection device 2 is configured as a strut and connects the core engine shroud 11 to the external wall 12 that is not shown here. Arranged at the core engine shroud 11 is the housing 16 of the first connection device 2, in which the first air inlet opening 1 is disposed (shown here as a dashed line).

In this way, the first air inlet opening 1 is connected to the connection device 2. The first connection device 2 is connected to the core engine shroud 11 via a screw connection 14 in the interior of the housing 16.

In the inside of the housing 16, guiding devices 15 (see e.g. FIG. 7) for the air K are arranged.

For one thing, they ensure that the air K is used for cooling purposes, e.g. as it has been described in FIG. 3. What may alternatively be effected is a disk cooling of the turbine 101.

For another thing, the air K is also used for building up counter-pressure in the bearing housing 109 (see FIG. 4). For this purpose, the air K is guided here through a hollow strut 112 into the internal space of the core engine 105. Alternatively, a counter-pressure can also be built up in a disk housing of the turbine 101.

Figure 6:
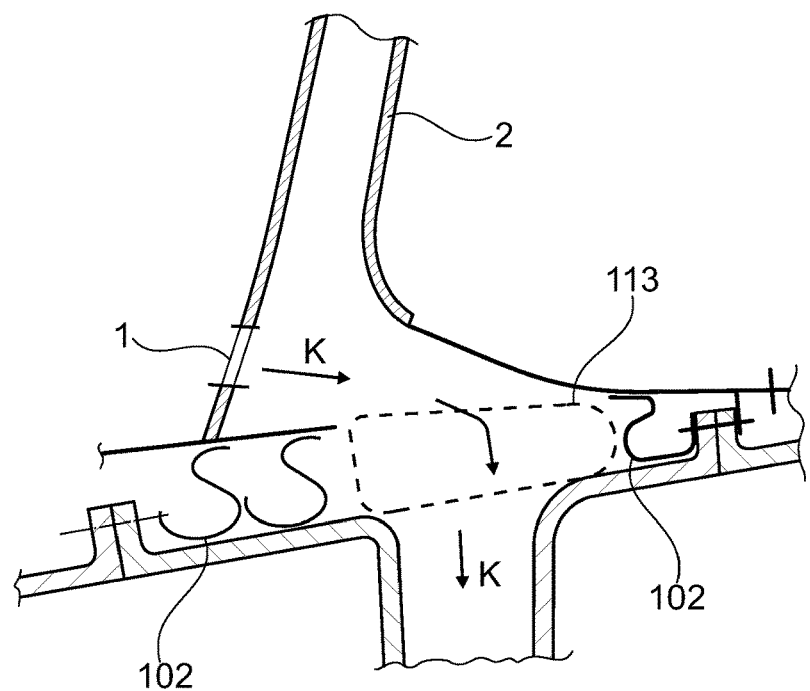
FIG. 6 shows a schematic sectional view in the area of the first air inlet opening and a separation of the air-filled areas from other parts of the core engine shroud.

FIG. 6 shows a sectional view of an embodiment in which a sealing barrier 102 separates a part of the core engine shroud 11 from another. Here, the air K is guided from the first inlet opening 1 into the inside of the core engine shroud 11 (see FIG. 5), so that a counter-pressure is built up there in an area that is not shown here.

At the same time, the air K is distributed in the circumferential direction of the core engine shroud 11 in a kind of annular channel 113 (indicated here by dashed lines) in order to cool areas of the core engine 105.

The area through which the air K is flowing is separated by the sealing barrier 102 from a front part (positioned to the left in FIG. 6) of the core engine shroud 11, so that the air K cannot easily enter this area. Here, the sealing barrier 102 has two circumferential springy, elastic ribbons that are bent in an S-shaped manner and that nestle against the inside as well as the outside of the confining surfaces, so that a sealing effect is achieved. In other embodiments, the sealing barrier 102 can be formed differently, e.g. in the form of a gaiter.

Figure 7:
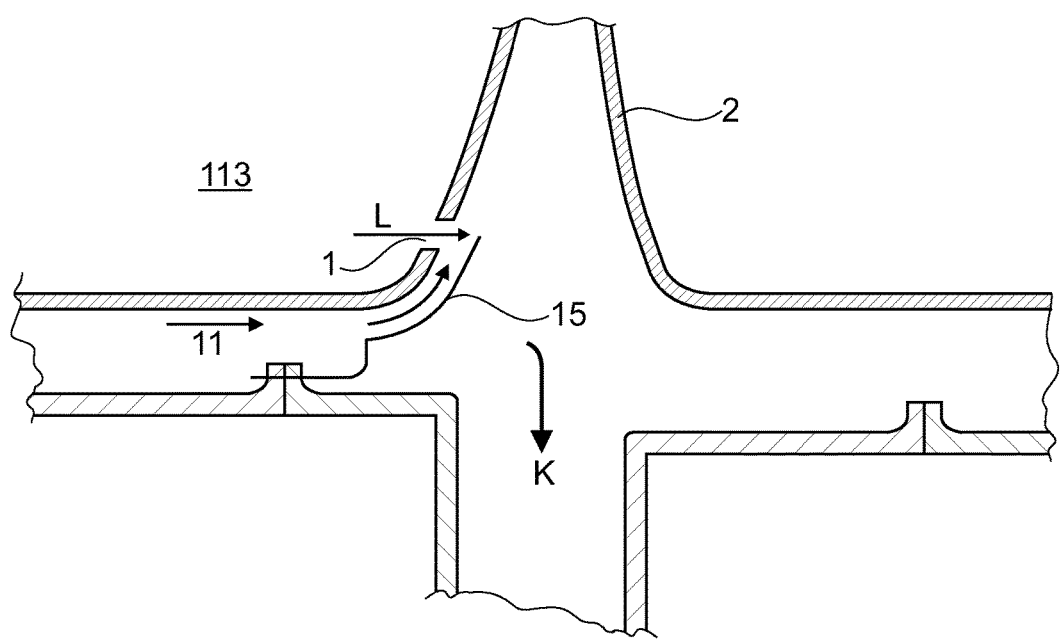
FIG. 7 a schematic sectional view in the area of the first air inlet opening having a device for creating an aerodynamic seal.

In FIG. 7, another embodiment is shown in which the entering air L is guided through an air flow M in the core engine shroud 11. The air flow M can e.g. come from a second air inlet opening 3. Through the guiding device 15, this air flow M is led to the first air inlet opening 1. In this way, the entering air L intermixes with the air flow M that is substantially flowing at a right angle to the same. This leads to turbulences in the combined flow, in particular an aerodynamic sealing, which can be used for controlling the air flows in the interior of the core engine shroud 11. A portion of the inflowing air L is then guided into the inside of the core engine 105 as cooling air K or as air K for building up counter-pressure.

An analogous conduction of the air flow M can also be used in the front part of the aircraft engine 100.

PARTS LIST

1 first air inlet opening
2 first connection device (e.g. strut)
3 second air inlet opening
4 second connection device
10 bypass duct
11 core engine shroud, internal wall bypass duct
12 external wall of the bypass duct
13 jacket housing
14 screw connection
15 guiding device
16 housing for connection device at the housing of the core engine
100 aircraft engine
101 turbine
102 sealing barrier
103 wall core engine
104 compressor
105 core engine
106 fastening ring
107 rear turbine housing
108 compressor wall
109 bearing housing
110 injection of oil
111 bearing
113 annular channel
L inflowing air
K air, in particular cooling air, air for building up counter-pressure
M air flow

The invention claimed is:

1. An aircraft engine with air guiding device, comprising:
    a bypass duct including an external wall;
    a core engine including a compressor, a combustion chamber and a turbine;
    a core engine shroud surrounding the core engine and forming an internal wall of the bypass duct;
    a connection device connecting the core engine shroud with the external wall of the bypass duct,
    a first air inlet opening positioned in the bypass duct and connected to the core engine for inflowing air from the bypass duct into the core engine, wherein the first air inlet opening is at least one chosen from connected to the connection device and arranged in the connection device;
    a sealing barrier positioned between the core engine shroud and a casing wall of at least one chosen from the compressor, the combustion chamber and the turbine and sealing the inflowing air entering through the first air inlet opening from other areas internally of the core engine shroud such that the inflowing air is directed to an interior of the core engine.

2. The aircraft engine with air guiding device according to claim 1, wherein the connection device is a strut.

3. The aircraft engine with air guiding device according to claim 2, wherein the strut is arranged at least one chosen from radially and tangentially with respect to the core engine shroud.

4. The aircraft engine with air guiding device according to claim 3, and further comprising a housing at the core engine shroud, wherein the first air inlet opening is arranged in the housing.

5. The aircraft engine with air guiding device according to claim 4, wherein the housing is at least one chosen from a protrusion of the core engine shroud and the strut.

6. The aircraft engine with air guiding device according to claim 5, wherein the first air inlet opening inflows air for cooling at least one chosen from an area of a wall of the turbine, a part of the connection device, an electric device and a bearing housing.

7. The aircraft engine with air guiding device according to claim 6, wherein the inflowing air forms a counter-pressure in a spacial area of bearings of at least one chosen from the turbine and the compressor.

8. The air guiding device according to claim 7, wherein the sealing barrier includes at least one chosen from an elastic ribbon, a circumferential ring, an elastic membrane and a gaiter.

9. The aircraft engine with air guiding device according to claim 8, and further comprising a second air inlet opening arranged inside the bypass duct upstream of the first air inlet opening.

10. The aircraft engine with air guiding device according to claim 9, wherein the inflowing air through at least one chosen from the first air inlet opening and the second air inlet opening suppresses an air flow from an internal area of the aircraft engine into the bypass duct.

11. The aircraft engine with air guiding device according to claim 1, and further comprising a further air inlet device positioned outside of the connection device.

12. The aircraft engine with air guiding device according to claim 1, and further comprising a housing at the core engine shroud, wherein the first air inlet opening is arranged in the housing.

13. The aircraft engine with air guiding device according to claim 12, wherein the housing is at least one chosen from a protrusion of the core engine shroud and a strut of the connection device.

14. The aircraft engine with air guiding device according to claim 1, wherein the first air inlet opening inflows air for cooling at least one chosen from an area of a wall of the turbine, a part of the connection device, an electric device and a bearing housing.

15. The air guiding device according to claim 1, wherein the sealing barrier includes at least one chosen from an elastic ribbon, a circumferential ring, an elastic membrane and a gaiter.

16. The aircraft engine with air guiding device according to claim 1, and further comprising a second air inlet opening arranged inside the bypass duct upstream of the first air inlet opening.

17. The aircraft engine with air guiding device according to claim 16, wherein the inflowing air through at least one chosen from the first air inlet opening and the second air inlet opening suppresses an air flow from an internal area of the aircraft engine into the bypass duct.

* * * * *